2,852,550

AMIDATION OF PHOSPHORUS HALIDES WITH ORGANIC AMINES

Kenneth L. Godfrey, St. Albans, W. Va., assignor to Monsanto Chemical Company, St. Louis, Mo., a corporation of Delaware No Drawing. Application February 27, 1956
Serial No. 567,736

8 Claims. (Cl. 260—461)

This invention relates to improvements in the amidation of phosphorus halides. More particularly, the invention relates to an improved method for introducing one or more organic amido groups in place of halogen in a phosphorus halide containing the radical

where X represents oxygen or sulfur and hlg represents halogen. The dangling valences may be satisfied by additional halogen atoms or by alkoxy, amido and other organic groups unreactive with the organic amidating agent.

The amidation of phosphorus halides is well known. The elements involved in the reaction of each halogen may be represented by the general equation

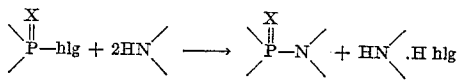

where X and hlg have the same significance as before. It will be noted that two moles of amine are required for each atom of halogen replaced. Half of the amine is consumed as by-product amine hydrochloride and amines are expensive reagents which must be recovered. Heretofore, separation of the amine hydrochloride and recovery of the amine has been a troublesome, expensive, time consuming operation. The advantage of a process which permitted charging only an amount of amine equivalent to the halogen desired to be replaced is obvious.

Phosphorus halides react readily with both ammonia and aliphatic amines. However, it was discovered that lower aliphatic amines react preferentially with phosphorus halides even in the presence of ammonia. While this is not true of phosphorus trihalides, it is generally true of phosphoryl and thiophosphoryl halides by which are meant phosphorus halides containing the

radical defined above. Thus, it was discovered that addition of ammonia to the incompletely amidated reaction mixture eliminated the amine salt altogether and resulted in consumption of essentially all the amine in formation of the desired product.

It will be appreciated that after reacting one molecular proportion of amine per each atom of halogen to be replaced the amidation is incomplete and the reaction mixture contains unreacted phosphorus halide and amine salt as well as product. The addition of ammonia to such an incompletely amidated reaction mixture is contemplated. By this step the reaction may be carried to completion without using the large excess of amine heretofore required. Alternatively, the ammonia may be added along with the amine but an excess of the ammonia should be avoided until all of the amine has been charged. However, adding ammonia before all of the amine has been charged lowers the yield and the reaction is then more difficult to regulate and control.

The molar quantity of amine reactant can be approximately equivalent to the halogen to be displaced and the molar quantity of ammonia can be in the same order of magnitude. An excess of ammonia is permissible but offers little advantage. Similarly, the ratio of amine may be increased but little advantage has been observed. The reaction is conveniently carried out in an organic solvent inert to the reactants. Sufficient solvent should be used to permit suitable agitation. In this connection the amount specified in Example 1 is about the minimum which permits suitable agitation using those particular reagents. Among suitable solvents are toluene, monochlorobenzene, chloroform and trichloroethylene. Of course, it is desirable to choose a solvent having a boiling point sufficiently different from that of the product so as not to interfere with isolation of the product.

The reactions are effected at moderate temperatures, 55–65° C. being a preferred range, but the reactions are quite successful within the range of 20–100° C. although temperatures outside this range are contemplated. A temperature of 40–100° C. covers the optimum range for feeding the amine and 35–80° C. the optimum range for feeding ammonia. The time of addition may be as fast as consistent with the temperature control desired. Of course, ammonia and lower aliphatic amines are volatile reagents and must be handled to avoid loss.

The maximum advantage of the process is secured when three halogens are replaced as illustrated in Example 1. The other examples illustrate use of lower ratios of amine to replace less than three reactive halogens. Examples of suitable reactions to which the new process may be advantageously applied comprise reaction of dimethylamine with phosphoryl chloride, phosphoryl bromide, thiophosphoryl chloride, thiophosphoryl bromide, tetramethylphosphorodiamidic chloride, phenylphosphonodichloridate, dimethyl phosphorochloridate, butyl phosphorodichloridate, propyl phosphorodichloridate, hexyl phosphorodichloridate, octyl phosphorodichloridate and dodecyl phosphorodichloridate. Further examples comprise amidation of diethyl phosphorochloridothioate, diethyl phosphorochloridate and dimethyl phosphorochloridate with dioctyl amine or diethylaminoethyl amine but preferably primary and secondary amines in which the organic substituents attached to the nitrogen are lower aliphatic hydrocarbon radicals, as for example methyl, ethyl, propyl, butyl and amyl amines, dimethyl amine, diethyl amine, diisopropyl amine, diallyl amine and dibutyl amine. As is well known, reactivity of amines with phosphorus halides decreases with increasing size.

By the use of ammonia, higher conversions of amine to desired product than heretofore reported have been obtained, reaction time cycles significantly reduced, filtering of hygroscopic amine hydrochloride eliminated and a simple, economical process provided which requires little attention or skill to carry out.

Example 1

Into a reactor was charged 103 parts by weight (0.67 mole) of phosphoryl chloride and 465 parts by weight of trichloroethylene. Gaseous dimethylamine (93.6 parts by weight, 2.08 moles) was passed under the surface of the agitated reaction mixture at such a rate as to allow the cooling system to control the temperature in the 55–65° C. range. Upon completion of the amine feed, 37.4 parts by weight (2.20 moles) of gaseous anhydrous ammonia was passed into the reaction mixture at such a rate as to permit the reaction to be held in the same 55–65° C. temperature range. Following a one-half hour hold period at 55–65° C., the reaction mixture was cooled to 20–30° C. and the by-product ammonium chloride removed by filtration. The salt cake was then washed free of product with three portions of trichloroethylene totalling 396 parts by weight. The salt cake may be discarded after free of solvent. The combined filtrate and washings were stripped of solvent by gradually applying heat. Ultimate stripping conditions desirably are 120° C. pot temperature at atmospheric pressure. Recovered solvent, if free of water and ammonia, may be recycled in the process. The crude product was then subjected to direct takeover distillation at 6 mm. absolute pressure. The product boiled at 97–99° C. at this pressure. In completing the distillation the residue may be heated as high as 140–150° C. The yield was about 82% of colorless, clear distilled hexamethylphosphoramide. The pot residue, a mushy viscous mixture, may be removed from the reactor by stirring with 270 parts by weight of hot water. Rinsing out with acetone periodically will help prevent buildup of residue.

*Example 2*

Into a reactor were charged 113 parts by weight (0.67 mole) of thiophosphoryl chloride and 360 parts by weight of monochlorobenzene. Gaseous dimethylamine (63.5 parts by weight, 1.41 moles) was passed under the surface of the agitating reaction mixture at such a rate as to permit control of the temperature at about 60° C. Upon completion of the amine feed, 26 parts by weight (1.52 moles) of gaseous anhydrous ammonia was passed into the reaction mixture at such a rate as to permit the reaction to be held at about the same 60° C. temperature range. Following a one-half hour hold period, the reaction mixture was cooled to 20–30° C. and by-product ammonium chloride removed by filtration. Salt cake was then washed free of product with monochlorobenzene totalling 308 parts by weight. The product was isolated as described in Example 1. From 116.9 parts by weight of crude product there was obtained 91 parts by weight, representing a 73% yield, of colorless tetramethylphosphorodiamidothioic chloride which distilled at 98–100° C. at 6 mm. absolute pressure.

*Example 3*

Into a suitable reactor was charged 103 parts by weight (0.67 mole) of phosphoryl chloride and 360 parts by weight of monochlorobenzene. Gaseous dimethylamine (60.2 parts by weight, 1.34 moles) was passed under the surface of the agitating reaction mixture at 60° C. followed by 22.8 parts by weight (1.34 moles) of gaseous anhydrous ammonia. The reaction was carried out and the product isolated as described in Example 1. There was obtained a 71.5% yield of tetramethylphosphorodiamidic chloride distilling at 98–105° C. at 6 mm. absolute pressure.

*Example 4*

In the procedure of Example 3, 109 parts by weight (0.67 mole) of ethyl phosphorodichloridate was substituted for the phosphoryl chloride. There was obtained a 66.2% yield of ethyl tetramethylphosphorodiamidate which distilled at 103–104° C. at 18 mm. absolute pressure.

*Example 5*

Into a suitable reactor was charged 57 parts by weight (0.35 mole) of ethyl phosphorodichloridate and 185 parts by weight of monochlorobenzene. Diethylamine (51.3 parts by weight, 0.70 mole) was added gradually to the reaction mixture over a period of about 30 minutes and maintaining the temperature at 60° C. After adding the amine, 12 parts by weight (0.70 mole) of gaseous anhydrous ammonia was run in over a period of about 17 minutes and the reaction mixture stirred for an additional 30 minutes, then cooled, the salt cake filtered, washed with about 150 parts by weight of monochlorobenzene, the residue stripped of solvent and vacuum distilled. The product, boiling at 125–134° C. at 17–23 mm. absolute pressure, was identified as ethyl tetraethylphosphorodiamidate. Analysis gave 11.9% nitrogen and 13.0% phosphorus as compared to calculated values of 11.9% nitrogen and 13.2% phosphorus.

*Example 6*

In the procedure described as Example 5, 67 parts by weight (0.35 mole) of butyl phosphorodichloridate was substituted for ethyl phosphorodichloridate and 31.5 by weight (0.70 mole) of dimethylamine substituted for diethylamine, to obtain an 81.5% yield of butyl tetramethylphosphorodiamidate.

*Example 7*

The charge and reaction conditions were the same as in Example 6 except 67.5 parts by weight (0.343 mole) of 2-chloroethyl phosphorodichloridate was substituted for butyl phosphorodichloridate. The fraction boiling at 126–130° C. at 9 mm. absolute pressure was identified as 2-chloroethyl tetramethylphosphorodiamidate. Analysis gave 14.1% phosphorus and 12.9% nitrogen as compared to calculated values of 14.5% phosphorus and 12.6% nitrogen.

*Example 8*

Into a reactor was charged 121 parts by weight (0.4 mole) of dodecyl phosphorodichloridate and 210 parts by weight of monochlorobenzene. Gaseous dimethylamine (36 parts by weight, 0.8 mole) was passed under the surface of the stirred reaction mixture while keeping the temperature at about 60° C. Upon completion of the amine feed, 13.61 parts by weight (0.8 mole) of gaseous anhydrous ammonia was passed into the reaction mixture at the same temperature and stirring at about 60° C. continued for 30 minutes longer. The reaction mixture was then cooled, by-product ammonium chloride removed by filtration, the salt cake washed free of product with 180 parts by weight of monochlorobenzene and the crude product distilled. The yield of distilled dodecyl tetramethylphosphorodiamidate was 67%.

*Example 9*

Into a reactor was charged 86.3 parts by weight (0.5 mole) of diethyl phosphorochloridate and 185 parts by weight of monochlorobenzene. Diethylamine (36.5 parts by weight, 0.5 mole) was added gradually over a period of about 40 minutes while keeping the temperature in the range of 55–65° C. Upon completion of the amine feed, 8.5 parts by weight (0.5 mole) of gaseous anhydrous ammonia was added in about 13 minutes at the same temperature and stirring continued for about 30 minutes, the salt cake filtered, washed with 160 parts by weight of monochlorobenzene, the filtrate and washings combined, stripped of solvent and the product distilled. A 55% yield of diethyl diethylphosphoamidate, boiling at 91° C. under 6 mm. pressure was obtained. Analysis gave 14.7% phophorus and 6.7% nitrogen as compared to calculated values of 14.8% phosphorus and 6.7% nitrogen.

*Example 10*

Into a reactor was charged 86 parts by weight (0.5 mole) of diethyl phosphorochloridate and 185 parts by weight of monochlorobenzene. Diallylamine (50.5 parts by weight, 0.52 mole) was added to the stirred reaction mixture while keeping the temperature at about 60° C. After adding the amine in about 25 minutes, 9.4 parts by weight (0.55 mole) of gaseous anhydrous ammonia was passed into the reaction mixture in 13.5 minutes at the same temperature and the mixture stirred for about 30 minutes longer, filtered, the salt cake washed free of solvent and the filtrate and washings combined. After stripping of solvent, the residue was distilled to obtain a 59% yield, boiling at 118° C. under 9 mm. pressure, of diethyl diallylphosphoroamidate.

Example 11

Into a reactor was charged 39 parts by weight (0.2 mole) of phenyl phosphonodichloridate and 185 parts by weight of monochlorobenzene. Gaseous dimethylamine (22.0 parts by weight, 0.5 mole) was added to the reaction mixture over a period of about 11 minutes while maintaining the temperature at 60° C. Upon completion of the amine feed, 8.5 parts by weight (0.5 mole) of gaseous anhydrous ammonia was added in about 13 minutes at the same temperature and stirring continued for about 30 minutes longer. The reaction mixture was then cooled, by-product ammonium chloride removed by filtration and the salt cake washed free of product with 157 parts by weight of monochlorobenzene. The combined filtrate and washings were stripped of solvent under reduced pressure to yield 42 parts by weight of a crystalline product. Recrystallization of the crude product from diethyl ether gave 23 parts by weight, representing a 54% yield, of white crystalline phenyl tetramethylphosphonodiamide, M. P. 82–84° C. Analysis gave 15.1% phosphorus and 13.7% nitrogen as compared to 14.8% phosphorus and 13.3% nitrogen for calculated values.

It is intended to cover all changes and modifications of the examples of the invention herein chosen for purposes of disclosure which do not constitute departures from the spirit and scope of the invention.

What is claimed is:

1. The process of amidation which comprises adding anhydrous ammonia to a partially amidated reaction mixture, one reactant being a compound having the structure

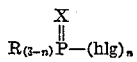

where $n$ is an integer at least one but less than four, hlg is selected from a group consisting of chlorine and bromine, X is a chalkogen having atomic weight less than 40 and R is selected from the group consisting of alkoxy, chloro substituted alkoxy, phenyl and di(lower alkyl)-amino and a second reactant being an amine containing at least one replaceable hydrogen attached to the nitrogen, the remaining valences being satisfied by a member of the group consisting of hydrogen, lower alkyl and lower alkenyl groups and neutralizing with ammonia the by-product amine hydrochloride in the presence of the partially amidated product so that further amidation takes place through reaction with the amine released by ammonia.

2. The process of amidation which comprises reacting approximately one molecular proportion of $POCl_3$, approximately three molecular proportions of dimethylamine and approximately three molecular proportions of anhydrous ammonia, the ammonia being added to the partially amidated reaction product to neutralize by-product amine hydrochloride in the presence of the partially amidated product but ammonia in excess of the amine hydrochloride present at any time being avoided until all the amine has been charged.

3. The process of claim 2 in which the reaction is carried out in an organic solvent inert to the reactants.

4. The process which comprises reacting approximately one molecular proportion of $POCl_3$ with approximately three molecular proportions of dimethylamine in an organic solvent inert to the reactants and then adding to the partially amidated reaction mixture approximately three molecular proportions of ammonia and isolating hexamethylphosphoramide.

5. The process which comprises reacting in an organic solvent inert to the reactants approximately one molecular proportion of $POCl_3$, approximately two molecular proportions of dimethylamine and approximately two molecular proportions of anhydrous ammonia, the ammonia being added to the partially amidated reaction product to neutralize by-product amine hydrochloride in the presence of the partially amidated product but ammonia in excess of the amine hydrochloride present at any time being avoided until all the amine has been charged.

6. The process which comprises reacting in an organic solvent inert to the reactants approximately one molecular proportion of $PSCl_3$, approximately two molecular proportions of dimethylamine and approximately two molecular proportions of anhydrous ammonia, the ammonia being added to the partially amidated reaction product to neutralize by-product amine hydrochloride in the presence of the partially amidated product but ammonia in excess of the amine hydrochloride present at any time being avoided until all the amine has been charged.

7. The process which comprises reacting in an organic solvent inert to the reactants approximately one molecular proportion of a di-lower alkyl phosphorochloridate, approximately one molecular proportion of $(R)_2NH$ where R is a lower aliphatic hydrocarbon radical and approximately one molecular proportion of anhydrous ammonia, the ammonia being added to the partially amidated reaction product to neutralize by-product amine hydrochloride in the presence of the partially amidated product but ammonia in excess of the amine hydrochloride present at any time being avoided until all the amine has been charged.

8. The process which comprises reacting in an organic solvent inert to the reactants approximately one molecular proportion of an alkyl phosphorodichloridate, approximately two molecular proportions of dimethylamine and approximately two molecular proportions of anhydrous ammonia, the ammonia being added to the partially amidated reaction product to neutralize by-product amine hydrochloride in the presence of the partially amidated product but ammonia in excess of the amine hydrochloride present at any time being avoided until all the amine has been charged.

References Cited in the file of this patent

UNITED STATES PATENTS

| 2,671,109 | Hartley et al. | Mar. 2, 1954 |
| 2,678,940 | Boyer et al. | May 18, 1954 |
| 2,752,392 | Saul et al. | June 26, 1956 |

FOREIGN PATENTS

| 900,814 | Germany | Jan. 4, 1954 |